(12) United States Patent
Hoballah

(10) Patent No.: US 6,398,557 B1
(45) Date of Patent: Jun. 4, 2002

(54) DEVICES, METHODS AND KITS FOR TRAINING IN SURGICAL TECHNIQUES

(75) Inventor: Jamal J. Hoballah, Iowa City, IA (US)

(73) Assignee: The University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/398,992

(22) Filed: Sep. 17, 1999

(51) Int. Cl.$^7$ ............................................. G09B 23/28

(52) U.S. Cl. ...................................... 434/272; 434/262

(58) Field of Search ................. 434/262, 267, 434/268, 270, 272; 73/862, 862.08, 862.42, 862.46, 862.471, 862.472

(56) References Cited

U.S. PATENT DOCUMENTS

| | | | |
|---|---|---|---|
| 2,678,505 A | | 5/1954 | Munson .......................... 35/17 |
| 2,704,897 A | | 3/1955 | Lade .............................. 35/17 |
| 2,871,579 A | | 2/1959 | Niiranen et al. ................ 35/17 |
| 2,871,584 A | | 2/1959 | Poole ............................. 35/17 |
| 2,995,832 A | | 8/1961 | Alderson ........................ 35/17 |
| 3,339,290 A | | 9/1967 | Doyle ............................ 35/17 |
| 3,722,108 A | | 3/1973 | Chase ............................ 35/17 |
| 3,775,865 A | | 12/1973 | Rowan ........................... 35/17 |
| 3,848,463 A | * | 11/1974 | Hejzlar ................... 73/141 AB |
| 3,938,380 A | * | 2/1976 | Karlsson .................... 73/141 R |
| 4,005,600 A | * | 2/1977 | Hoog ....................... 73/133 A |
| 4,037,469 A | * | 7/1977 | Nordstrom ................. 73/141 A |
| 4,065,963 A | * | 1/1978 | Saxl ............................. 73/144 |
| 4,081,996 A | * | 4/1978 | Jennings ................... 73/141 A |
| 4,140,317 A | * | 2/1979 | Ramney ................... 273/102 R |
| 4,165,637 A | * | 8/1979 | Kooman ................... 73/141 A |
| 4,321,047 A | | 3/1982 | Landis ........................ 434/262 |
| 4,336,720 A | * | 6/1982 | Prokop .................... 73/862.53 |
| 4,350,048 A | * | 9/1982 | Kovacs .................... 73/862.64 |

(List continued on next page.)

OTHER PUBLICATIONS

Thomas, W.E.; Lee,P.W.; Sunderland, G.T.; and Day, R.P., A preliminary evaluation of an innovative synthetic soft tissue simulation module ('Skilltray') for use in basic surgical skills workshops, Annals of the Royal College of Surgeons (Supplement) 1996. vol. 78, pp. 268–271.

Zikria, B.A., *Manual of Surgical Knots*, published by Ethicon, Inc., 1981.

Photograph of Davis Geck device. Available at least as early as Apr. 8, 1999.

Photograph of USSC sutures device. Available at least as early as Apr. 8, 1999.

Photograph of Ethicon device. Available at least as early as Apr. 8, 1999.

Photograph of GoreTex device. Available at least as early as Apr. 8, 1999.

*Primary Examiner*—Kien T. Nguyen
*Assistant Examiner*—Kurt Fernstrom
(74) *Attorney, Agent, or Firm*—Woodard, Emhardt, Naughton, Moriarty & McNett

(57) ABSTRACT

The present invention provides devices, methods and kits for practicing surgical and/or clinical techniques, including suture-tying techniques, tying sutures against tension, separation and suturing of blood vessels and making incisions and sutures in skin and subcutaneous tissue. The invention finds advantageous use in situations in which it is advantageous to simulate a medical procedure and/or to practice a movement that may be encountered in the performance of a medical procedure. Devices and methods of the invention for practicing suture tying may be advantageously used so that the user is made aware when excessive pressure is exerted during the tying of a suture on a hook. An excellent kit provided by the invention includes a container configured of foldable panels and one or more of the following: a suture tying device, a tying-against-tension device and devices that simulate physical properties of skin, blood vessels and/or other tissue.

48 Claims, 8 Drawing Sheets

U.S. PATENT DOCUMENTS

| | | | |
|---|---|---|---|
| 4,386,917 A | 6/1983 | Forrest | 434/267 |
| 4,481,001 A | 11/1984 | Graham et al. | 434/267 |
| 4,596,528 A | 6/1986 | Lewis et al. | 434/270 |
| 4,789,340 A * | 12/1988 | Zikria | 434/272 |
| 4,895,028 A * | 1/1990 | Mayer | 73/827 |
| 4,907,458 A * | 3/1990 | Biggs | 73/827 |
| 5,011,200 A * | 4/1991 | Glancy | 292/113 |
| D326,112 S | 5/1992 | Zikria | D19/62 |
| 5,112,228 A | 5/1992 | Zouras | 434/272 |
| 5,149,270 A | 9/1992 | McKeown | 434/262 |
| 5,230,630 A | 7/1993 | Burgett | 434/262 |
| 5,310,348 A | 5/1994 | Miller | 434/262 |
| 5,320,537 A | 6/1994 | Watson | 434/272 |
| 5,358,408 A | 10/1994 | Medina | 434/262 |
| 5,396,895 A | 3/1995 | Takashima et al. | 128/687 |
| 5,542,870 A * | 8/1996 | Westersund | 446/75 |
| 5,727,948 A | 3/1998 | Jordan | 434/267 |
| 5,766,016 A | 6/1998 | Sinclair et al. | 434/262 |
| 5,775,916 A | 7/1998 | Cooper et al. | 434/267 |
| 5,850,033 A | 12/1998 | Mirzeabasov et al. | 73/12.01 |
| 5,873,732 A | 2/1999 | Hasson | 434/262 |
| 5,873,863 A | 2/1999 | Komlosi et al. | 604/259 |

* cited by examiner

DEVICES, METHODS AND KITS FOR TRAINING IN SURGICAL TECHNIQUES

BACKGROUND OF THE INVENTION

The present invention relates to the field of devices, methods and kits for use in training medical personnel by providing such persons with the opportunity to practice surgical techniques outside the operating room. The invention involves devices, methods and kits for practicing surgical and/or clinical techniques, including sensitive surgical knot tying techniques using devices that indicate when excessive pressure is exerted during the tying of a surgical knot, and incising, suturing and tying techniques using devices that simulate physical properties of skin, blood vessels or other tissue.

Medical, dental and veterinary students as well as more experienced doctors, dentists and veterinarians learning new surgical techniques must undergo extensive training before they are optimally qualified to perform surgery. With respect to a student, the training must teach the student proper techniques for cutting through various types of tissue, for suturing severed tissue and for tying sutures against tension or around delicate tissues. In particular, the student must gain experience in suturing a broad variety of tissue types, including muscles, blood vessels, nerves and the like.

In general, a student's specific training for a surgical procedure is limited to medical textbooks, research, observation of others and practice. With regard to the issue of practice, it would be advantageous for students and medical personnel to acquire as much hands-on experience as possible operating on actual or simulated body structures when learning surgical procedures. Such practice can shorten the learning curve in the operating room. For example, a student may perform procedures on human cadavers or on animals; however, both cadavers and animals for surgical training are relatively expensive. Additionally, many humane societies vehemently oppose the performance of unnecessary surgery on animals. While some synthetic training aids have been proposed, the amount of practical experience a student can obtain prior to performing an actual surgery continues to be relatively limited.

As a result of the inherently limited amount of practical experience a student can obtain prior to performing a procedure on a patient, a student may have insufficient training to perform certain surgical fictions in an optimal manner in an operating room setting. It is therefore crucial that a student obtain as much practice as possible before performing surgery for the first time on a patient. It is also crucial that physicians be able to maintain their skills or acquire new skills outside the surgery room. While a physician may have been fully qualified to perform a certain procedure, the lapse of time or the evolution of new technology may render the physician ill-trained for the procedure. Moreover, even if the physician has been trained for a new procedure, the period of training is very short and often does not fully prepare a physician for the procedure. Thus, there is also a need for physicians to be able to acquire practice outside the operating room.

In view of the above, there is a continuing need for development of training aids for practicing surgical techniques such as suture tying. The present invention addresses these needs and has additional benefits and advantages.

SUMMARY

The present invention provides devices and kits, as well as methods associated therewith, for teaching medical students and trainees in surgical specialties various surgical principles, and for providing students, trainees and physicians the opportunity to practice one or more surgical techniques. The embodiments of inventive devices and kits exhibit a variety of excellent features.

The invention may be used to simulate a medical procedure and/or practice a movement that may be encountered in the performance of a medical procedure. The invention pertains to devices, methods and kits that may be used to practice techniques outside the operating room. The invention also makes it possible to teach and/or practice various techniques without requiring the user to actually perform the suturing on a human patient in order to obtain the necessary experience to become competent at performing the various techniques. Techniques that may be practiced in accordance with the invention include, for example, sensitive suture tying; tying sutures against tension; separation and suturing of blood vessels; over-sewing, repairing or reconnecting blood vessels; and making incisions and sutures in skin and subcutaneous tissue.

One form of the present invention is a unique surgical technique practice device. Other forms include a unique method of practicing surgical knot tying and a unique kit for surgical knot formation practice.

Another form of the present invention is a device including a member that registers when excessive force is used to form a surgical knot.

According to yet another form of the invention, there is provided a device for practicing suture tying techniques that includes (1) a base; (2) an elongate member at rest upon said base, said elongate member having a first end and a second end, wherein said elongate member is in contact with said base, and wherein said elongate member is movably engaged to said base, and (3) a first hook attached to said elongate member. Said member is operable to move from a first position to a second position relative to said platform in response to exertion of a predetermined force on said hook by tying a surgical knot thereto, and also operable to be reconfigured in said first position. It is, of course, understood that, when such a device is a part of a kit as described more fully below, the base may be a panel of the kit container.

A further form of the invention includes a device for practicing suture tying that includes (1) a base; (2) a member at rest upon said base, wherein said member is in contact with said base; (3) a first hook attached to said member; and (4) a signaling mechanism that activates when at least a portion of said member moves away from said base. Exertion of a threshold force upon said first hook causes said member to move such that at least a portion of said member moves away from said base.

Still a further form of the invention includes a method for practicing suture tying techniques that includes (1) providing a practice device comprising a base; a movable member at rest upon said base, wherein said member is in contact with said base; and a first hook attached to said member such that exertion of an actual force in excess of a threshold force upon the first hook causes at least a portion of said member to move away from said base; (2) forming a surgical knot that engages the hook; and (3) monitoring the device to determine whether at least a portion of said member moves away from said base, thereby indicating that the actual force exceeds the threshold force.

In another form, there is provided a kit for practicing techniques common to a variety of surgical procedures. A kit may include (1) a container comprising a plurality of substantially planar panels, the panels being serially hinged together such that the panels can be positioned in a closed position in which the panels form a container, and an open position in which the panels are disposed adjacent to and coplanar with one another; and (2) one or more devices for practicing a surgical technique or an action that might be taken during a surgery. One such device may be associated with a first panel for practicing suture-tying techniques. This device includes a member movably engaged to the panel, the member having a first hook attached thereto. Another such device may be associated with a second panel for practicing suture-tying techniques against tension. This device includes first, second, third and fourth retaining structures, a first elastic member spanning the first and second retaining structures, and a second elastic member spanning the third and fourth retaining structures. The kit may also include a skin simulator and/or a blood vessel simulator as described in greater detail below. In addition, the kit may advantageously include surgical instruments and supplies, such as, for example, needle holders, forceps, scissors, needles, threads, sutures and/or other filaments.

It is one object of the invention to provide devices, methods and kits for training in surgical techniques.

It is also an object of the invention to provide devices for the practice of sensitive tying of sutures in or around delicate tissues, wherein the devices can be monitored by a user to determine if the pressure exerted on the substrate object exceeds a threshold pressure.

Another object of the invention is to provide kits that may be effectively used to practice one or more surgical techniques and that are readily portable and inexpensive.

Further forms, embodiments, objects, advantages, benefits, aspects and features of the present invention will be apparent from the drawings and detailed description herein.

BRIEF DESCRIPTION OF THE FIGURES

Although the characteristic features of this invention will be particularly pointed out in the claims, the invention itself, and the manner in which it may be made and used, may be better understood by referring to the following descriptions taken in connection with the accompanying figures forming a part hereof.

DESCRIPTION OF THE PREFERRED EMBODIMENTS

Figure 1:
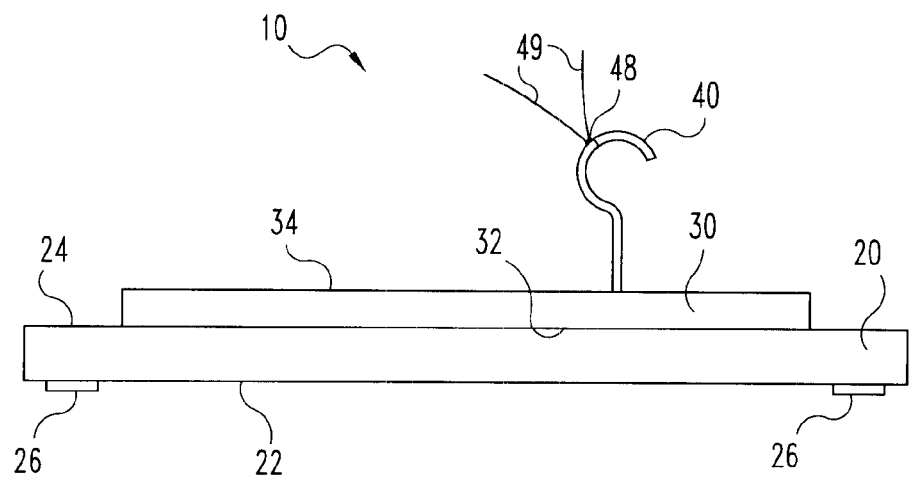
FIG. 1 is a side elevation view of a first embodiment of a tying device in accordance with the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated therein being contemplated as would normally occur to one skilled in the art to which the invention pertains.

The invention finds advantageous use in situations in which it is advantageous to simulate a medical procedure and/or to practice a movement that may be encountered in the performance of a medical procedure. Techniques that may be practiced in accordance with the invention include, for example, sensitive suture tying; tying sutures against tension; separation, suturing over-sewing, repairing or reconnecting blood vessels; and/or making incisions and sutures in skin and subcutaneous tissue.

In one aspect, the invention provides a device 10 for practicing suture-tying techniques. Referring to FIG. 1, the device includes a base 20 that is preferably made of a relatively rigid material and that is preferably capable of remaining in a stationary position while the device 10 is in use. In this regard, the base 20 may be made of a relatively heavy material so that the base is maintained in a stationary position by the force of gravity. Alternatively, the base may comprise on its lower surface 22 one or more mounting devices 26, such as, for example, suction cups, rubber feet, or a coating of a high-friction, tacky material that tends to grip a surface upon which the device rests, such as, for example, a laboratory bench, a table or a desk. Alternatively, the mounting devices may simply comprise straps of scotch tape or metallic clamps to stabilize the base on the table, bench or the like. The mounting devices 26 advantageously keep the device 10 relatively stationary on such a surface, thereby releasably attaching the device to such a surface, and permitting the user to employ both hands while practicing a particular surgical technique. As described more fully below, if the device 10 is included in a kit, with or without other practice objects, the base may advantageously be a panel of the kit container.

At rest upon the upper surface 24 of the base 20 is member 30. Member 30 has a lower surface 32 in contact with the upper surface 24 of the base 20, and an upper surface 34 to which is attached a hook 40 configured for engagement by a surgical knot 48 tied from a filament 49. Surgical knot 48 and filament 49 are schematically shown in FIG. 1. It is preferred, but not imperative, that the lower surface 32 of the member 30 and the upper surface 24 of the base 20 be substantially planar. If surfaces 32 and 24 are not planar, it is preferred that the surfaces be substantially complementary of one another such that, when the member 30 is at rest upon the base 20, a significant portion of surface 32 is in contact with surface 24 or a spacer positioned therebetween.

As used herein, the term "hook" is intended to refer to a structure around which a filament may be tied to practice surgical suture tying. While such a hook is depicted in the drawings in a particular way, it is not intended that the invention be limited to a specific form. The hook may alternatively comprise a wide variety of different shapes, so long as a given shape is capable of receiving a surgical knot and otherwise functioning as described herein. The hook may also have a cloth material associated therewith that the user may use to stitch and tie. In this embodiment, a pulling force upon the cloth will indirectly exert a force upon the hook in a similar manner as would occur if no cloth were present.

The term "filament" is intended to refer to a strand, thread, fiber or the like that is of the type to form an actual hand-tied suture as would be used in a surgical procedure, or that simulates such a suture, and that may be used to practice tying surgical knots. It is intended that the term "filament" encompass filaments that comprise a single strand or multiple strands. Member 30 and hook 40 are preferably fixed to each other such that movement of the hook 40 will result in a corresponding movement of the member 30.

When the device 10 is being used to practice suture tying techniques, the user may advantageously loop a filament over the hook 40 and tie one of a wide variety of surgical knots in the filament, with the objective of the exercise being to tie a desired knot around the hook without exerting a substantial pulling pressure or tension force upon the hook. Alternatively, a cloth may be attached to the hook and the user may introduce a stitch into the cloth and tie a surgical knot in the same, with the objective of this exercise similarly being to tie a desired surgical knot without exerting a substantial pulling pressure or tension force upon the cloth. Mastery of tying surgical knots without exerting a substantial pulling pressure is important, for example, so that, in an operation upon an actual patient, knots can be tied around delicate tissues without causing damage to the tissues. While it is understood that a certain amount of pressure may typically be exerted upon a tissue by a suture without causing damage, exceeding a threshold amount of force may result in tissue damage. It is therefore preferred that the member 30 be configured such that, if the filament being tied onto the hook 40 exerts a force upon the hook 40 in excess of a threshold force, at least a portion of the member is caused to move relative to the base, indicating that the threshold force was exceeded. The threshold force preferably equals a force above which a tissue being simulated may be damaged.

Figure 3:
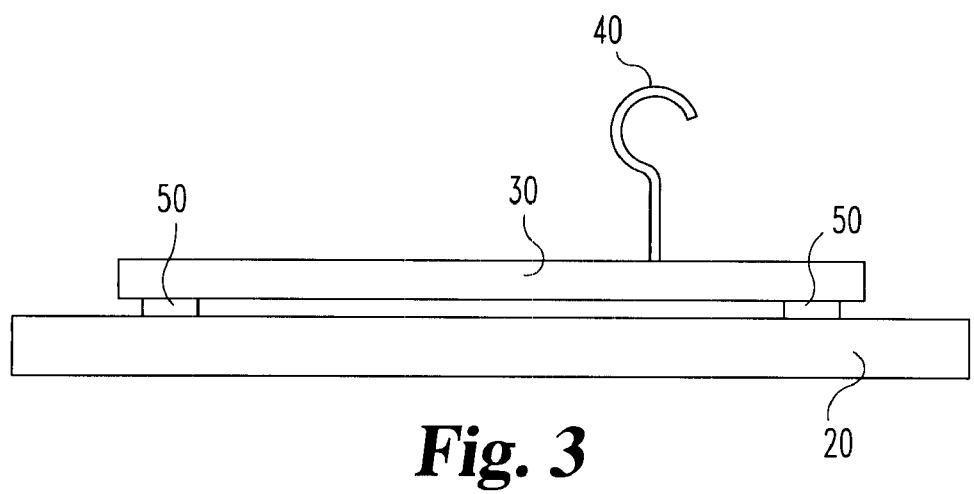
FIG. 3 is a side elevation view of a third embodiment of a tying device in accordance with the invention.
Figure 4:
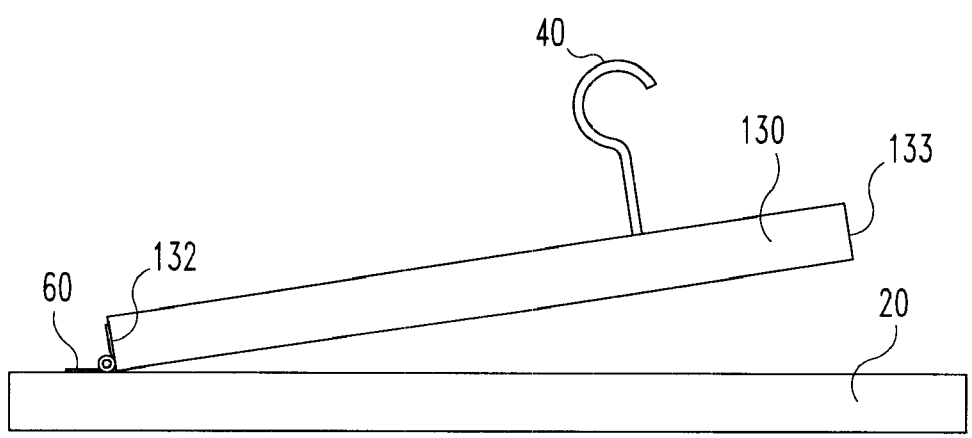
FIG. 4 is a side elevation view of a fourth embodiment of a tying device in accordance with the invention.

In certain embodiments, the member 30 is movably attached to the base 20. The member 30 may, for example, be releasably attached to the base using one or more releasable fasteners 50, as depicted in FIG. 3. The releasable fastener 50 may comprise VELCRO, a well known and commercially available material, or another type of hook and loop fastener, whereby the threshold force equals the sum of the force necessary to separate the hooks and loops of the fastener and the force necessary to overcome the force of gravity upon the member. Alternatively, the releasable fastener or fasteners 50 may comprise releasable, reusable adhesive material. Such a material is described in U.S. Pat. No. 4,783,354 to Fagan, U.S. Pat. No. 5,413,302 to Ferster and U.S. Pat. No. 5,738,325 to Brown, which, along with all other references cited herein, are hereby incorporated herein by reference in their entirety.

Figure 2:
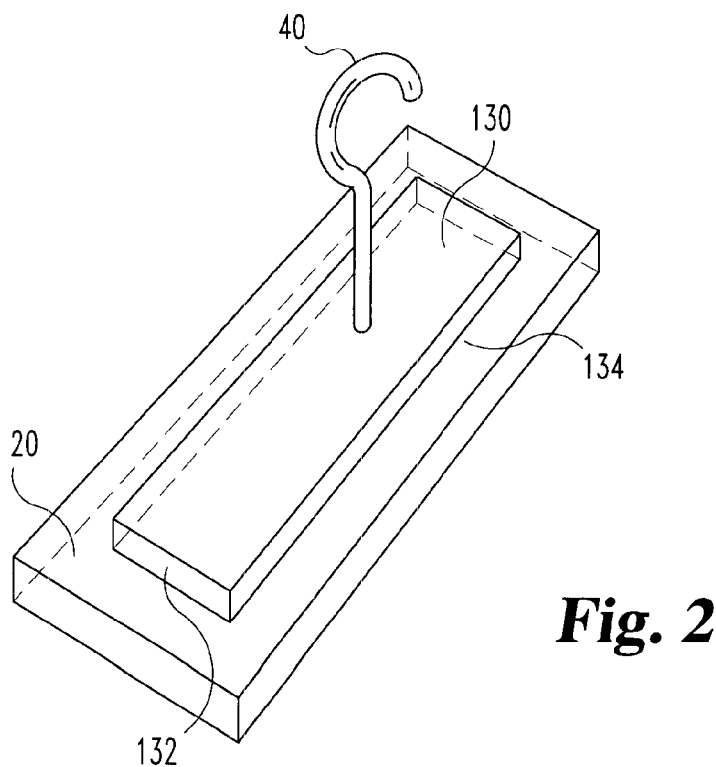
FIG. 2 is a perspective view of a second embodiment of a tying device in accordance with the invention.

In one embodiment of the device, as depicted in FIG. 2, the member is an elongate member 130 and, preferably, a substantially flat elongate member. For purposes of example, the member may comprise a plank commensurate in size and shape to a ruler, such as, for example, a six-inch ruler, a twelve-inch ruler or a ten- or twenty-centimeter ruler. Elongate member 130 may advantageously be pivotally attached to the base 20, either at a first end 132 of the member 130 or at a first side 134 of the member 130, preferably at end 132. The member may be pivotally attached, for example, using a hinge 60, as depicted in FIG. 3. While the hinge 60 is illustrated in a particular configuration in FIG. 3, as used herein, the term "hinge" is intended to refer in this context to a fastener that pivotally attaches two pieces, and may take a variety of forms. Alternatively, member 130 may comprise a flexible material, and member 130 may be fixedly attached to base 20 at a first end 132. In this embodiment, the threshold force is related to the flexibility of the member 130, because member 130 must flex in order for a portion thereof to move in relation to base 20. End 132 of the member 130 may, for example, be glued or pasted to the base or may be inserted into a boot formed in or attached to the base 20 to fix end 132 to base 20 (not shown).

Figure 5:
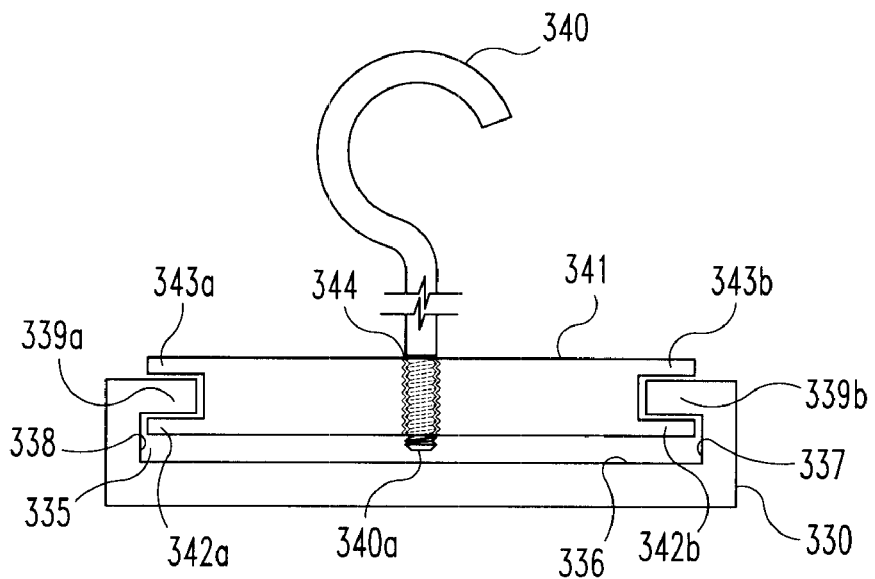
FIG. 5 is a partial sectional view of a fifth embodiment of a tying device in accordance with the invention.

In an embodiment in which the elongate member 130 is attached at end 132 to the base 20, the member 130 may be configured such that the hook 40 is slidable along the length of the member 130 between a point adjacent end 132 and a point adjacent end 133 of the member 130. It is preferred that the hook 40 and the member 130 be configured such that sliding of the hook is prevented when the device is in use. For example, the hook and the member may be configured such that the hook may be loosened and slid to an alternative position, and then be retightened so that the hook will not slide further during a surgical knot tying exercise. This may be accomplished, for example, as depicted in FIG. 5, by providing member 330 defining a slot 335 therein, a bracket positioned in the slot and configured to engage the member, and a hook configured to engage the bracket and the member.

In this embodiment, the member 330 defines a slot 335 having a bottom surface 336 and side surfaces 337, 338, and the member includes flanges 339a and 339b defining partial upper surfaces of the slot 335. In the slot is positioned a bracket 341 comprising lower flanges 342a, 342b and, optionally, upper flanges 343a, 343b, for holding a lower portion of the bracket 341 in the slot 335 defined in the member 330. The bracket also defines a recess 344 for receiving a lower portion of the hook 340, and defines threads configured to engage complementary threads defined in the lower portion of the hook 340, as depicted in FIG. 5. When the hook is rotated such that hook threads engage bracket threads, the bottom surface 340a of hook moves toward lower surface 336 of the slot and, upon additional rotation, frictionally engages lower surface 336. The lower flanges 342a, 342b of bracket 341 then engage flanges 339a, 339b of the member, thereby providing a point of contact by which pressure between the bottom surface 340a of the hook and lower surface 336 of slot is maintained. It is seen in this embodiment that, by rotating the hook in the opposite direction, the frictional engagement of the hook to the member is released, whereupon the hook and bracket may be slid to another position along the slot and retightened for use.

Figure 5A:
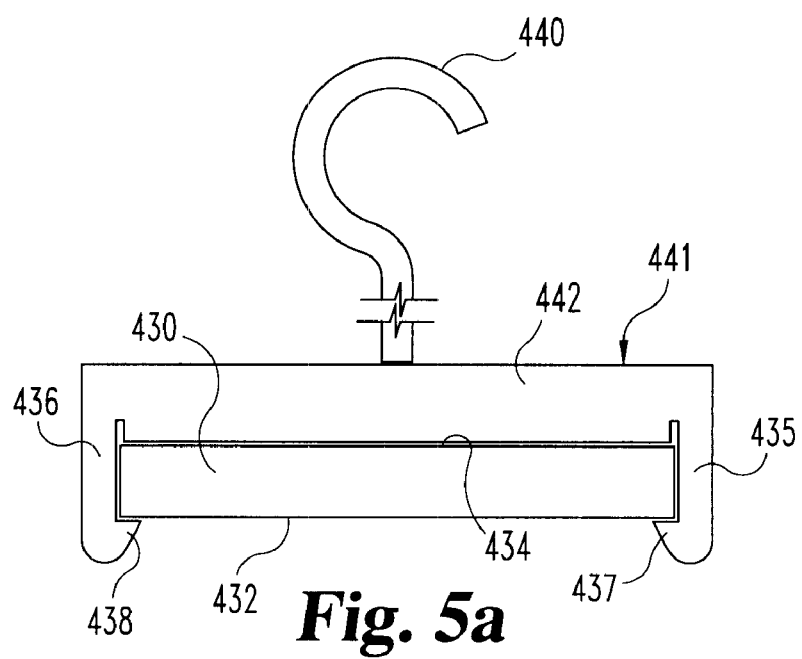
FIG. 5a is a side elevation view of a sixth embodiment of a tying device in accordance with the invention.

In another aspect, a representative example of which is depicted in FIG. 5a, member 430 has a bracket 441 configured to frictionally engage the member 430. For example, the bracket 441 preferably includes a main body 442 at rest upon the upper surface 434 of the member 430, and two engagement arms 435, 436 that extend down along the sides of the member, with portions 437, 438 positioned adjacent the lower surface 432 of the member 430 for frictional engagement with the lower surface 432. The bracket 441 is in this manner frictionally and slidably engaged to the member. The hook 440 may be rigidly attached to the bracket 441 in this embodiment. A representative example of a mechanism of this type may be found, for example, in a number of commercially available rulers, typically metallic rulers, that have sliding brackets frictionally attached thereto. Such a ruler may be obtained, for example, from the L.S. Starrett Co. (Athol, Mass.), or from General Tools Mfg. Co., Inc. (New York, N.Y.).

A feature of a device in which the hook is slidably attached to the member is that the distance of the hook from the hinge may be altered to readily adjust the threshold force necessary to move the member away from the base. It is of course understood that as the hook is moved farther from end 132, the threshold force decreases, and as the hook is moved closer to end 132, the threshold force increases, as long as other factors, such as, for example, the weight of the member, the flexibility of the material and the amount of friction applied by the hinge remain constant.

Figure 6:
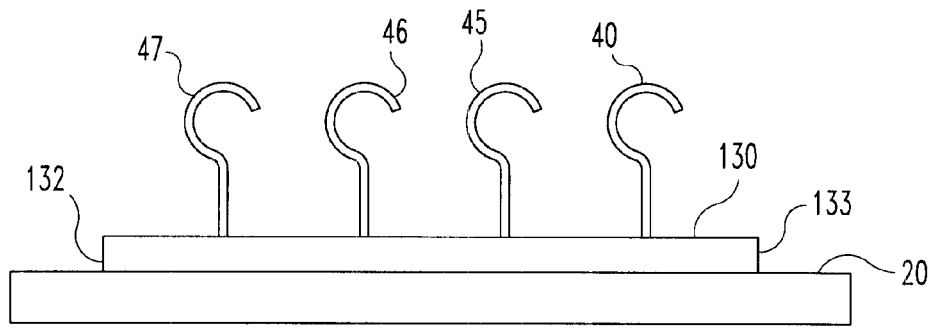
FIG. 6 is a side elevation view of a seventh embodiment of a tying device in accordance with the invention.

As depicted in FIG. 6, the device may alternatively comprise a plurality of hooks 40, 45, 46, 47, the hooks being attached to the elongate member 130 at a plurality of positions between a point adjacent end 132 of the member and a point adjacent end 133 of the member. In this embodiment, the hooks may be permanently affixed to the member or may be slidably attached. In this embodiment, the hooks may be placed at different positions for practicing suture tying with different threshold pressures.

Figure 7:
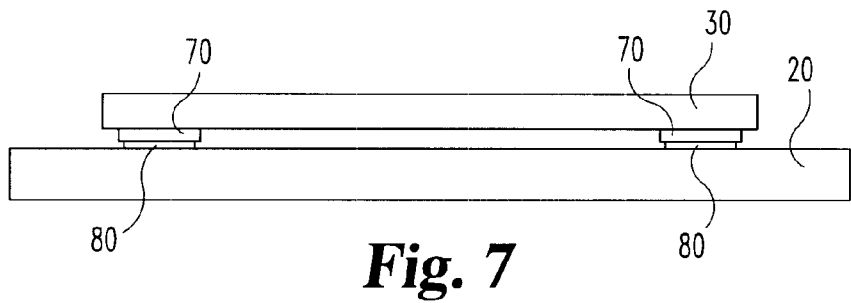
FIG. 7 is a side elevation view of a eighth embodiment of a tying device in accordance with the invention.

The member may alternatively be engaged to the base by a magnetic force. It is of course understood that magnets of varying intensities and/or magnetically attractable materials may be utilized to establish varying threshold forces for the device. In an embodiment utilizing such a magnetic force, one of the member or the base comprises a magnet or has one or more magnets 70 affixed thereto, and the other of the member or the base comprises a magnetically attractable or responsive material or has one or more magnetically attractable or responsive material objects 80 affixed thereto, as depicted in FIG. 7. In an alternative embodiment, a variable electromagnet is situated in base 20 to vary the amount of magnetic force applied to a magnetically responsive material comprising member 30 (not shown).

Of course, member 30, 130 need not be attached to the base 20, but alternatively may be engaged with the base by the force of gravity. In such an embodiment, it is preferred that the member be made of a relatively dense material, such as, for example, a metal or a quantity of sand in a container, such as a plastic or cloth pouch, so that an acceptable threshold force may be established by the weight of the member without necessitating that the member be excessively large. In this embodiment of the invention, it is preferred that the member weighs from about 25 to about 200 grams, more preferably about 50 grams, about 100 grams or about 150 grams. Of course, the device in this embodiment may include a plurality of members, each having a different weight for practicing tying at different threshold forces.

Figure 8:
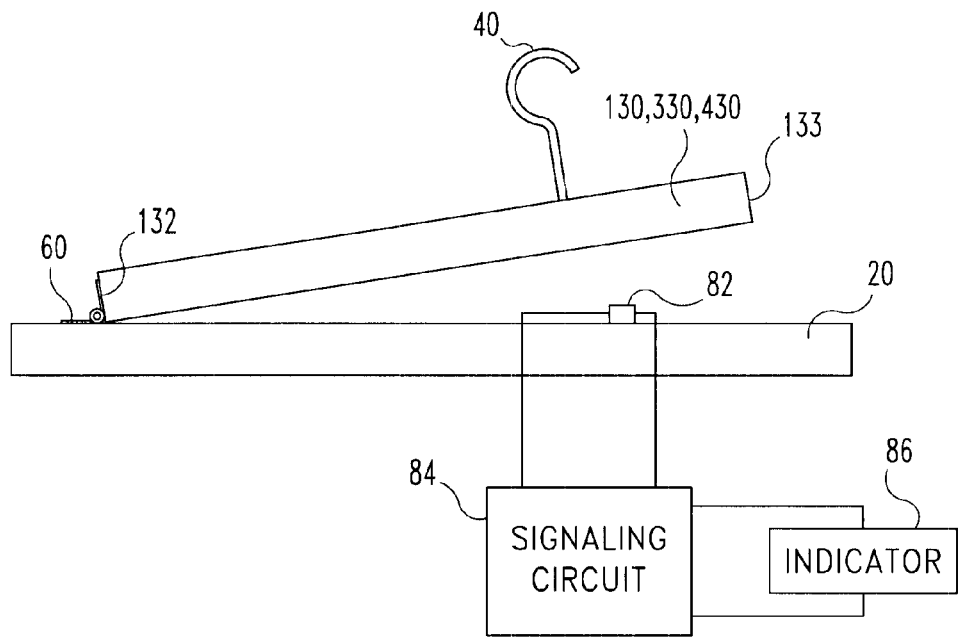
FIG. 8 is a side elevation view of an ninth embodiment of a tying device in accordance with the invention, including a schematic electrical circuit for activating an indicator.

In another preferred aspect of the invention, the device also comprises a signaling mechanism that emits a signal when at least a portion of the member moves away from the base. In one embodiment, for example, the device includes an electrical circuit, a portion of which is mounted on, or integrally associated with, the base and/or the member such that when the contact is broken between the base and at least a portion of the member, the circuit is broken, thereby activating an indicator such as, for example, a light source, a sound source or a source of vibration. In one example, depicted in FIG. 8, this mechanism includes a switch 82 that is opened when member 130, 330, 430 is separated from base 20. In response to the open state of switch 82, signaling circuit 84 activates indicator 86. Circuit 84 includes an electrical energy power source such as an electrical cell, battery of such cell, or a power supply connectable to a household or other common external source of electrical power.

Figure 9:
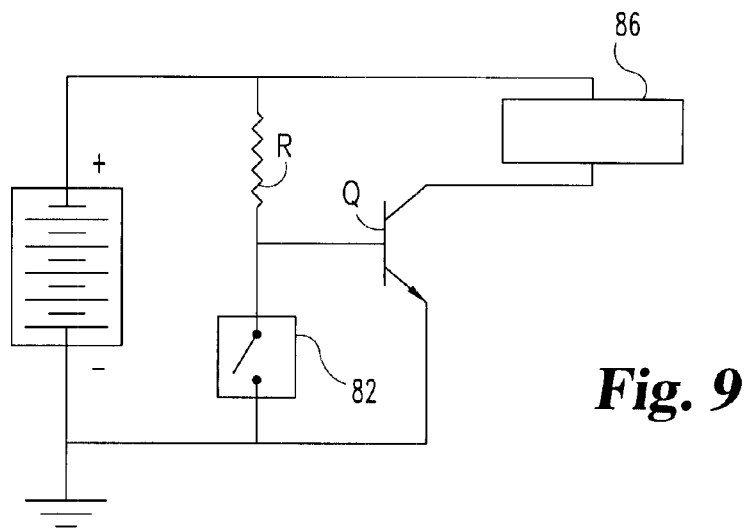
FIG. 9 is a schematic diagram of a representative signaling circuit of a tenth embodiment of a tying device in accordance with the invention.

In one example, depicted in FIG. 9, circuit 84 includes a battery with its positive terminal connected to a resistor, and with its negative terminal at ground. The switch is connected between the resistor and ground. An npn transistor has its base connected to a node between the resistor and the switch. The transistor emitter is at or close to ground. Indicator 86 is coupled in series between the transistor collector and the battery. For this example, when switch 82 is closed (member at rest), the voltage at the transistor base is generally at ground. However, when switch 82 is open, the resister is valued relative to the battery and transistor so that the transistor is turned on, causing a current flow from base to emitter. In turn, current flows through indicator 86 and the transistor collector, activating the indicator 86.

It is of course understood that the circuit may take a variety of forms known in the art and that the switch may also comprise alternative arrangements as well known in the art. The member itself, or a portion thereof, may be made of a material that conducts electricity, such as a metal or a metal alloy. Thus, where a portion of the circuit is positioned beneath the member, movement of the member away from the base breaks the circuit, resulting in activation of the signal.

The present invention also provides a method for practicing sensitive suture tying techniques. To practice the method of the invention, one first provides a practice device comprising a base, a movable member at rest upon the base and having attached thereto a hook, whereby the exertion of a force upon the hook in excess of a threshold force causes the member to move relative to the base. The method also includes forming a surgical knot that engages the hook. The method also comprises monitoring the device to determine whether at least a portion of the member moves away from the base, thereby indicating that the force exerted upon the hook exceeds the threshold force.

Also provided by the present invention is a kit for practicing techniques common to a variety of surgical procedures. The kit preferably includes a container comprising a plurality of panels, and one or more devices associated with at least one of the panels for practicing surgical techniques such as, for example, tying sutures against tension, separating blood vessels from surrounding tissue, making incisions and performing sensitive suture tying techniques. The panels are preferably configured to be folded, and may be unfolded such that the panels are substantially coplanar. The panels are preferably connected together by a flexible hinge arrangement. By "hinge arrangement" and "hinged" in the context of panel connections, it is not intended that the connection of panels in accordance with the invention be limited to the use of actual hinges, such as metallic hinges. Rather, it is intended that "hinge arrangement" refer to a wide variety of arrangements whereby an edge of one panel is pivotally connected to an edge of another panel. It is intended, for example, that this term encompass a fold in an otherwise substantially rigid material, such as, for example a piece of corrugated cardboard or plastic. In such an embodiment, the fold is the hinge arrangement, and the fold defines the border between two panels.

Figure 10:
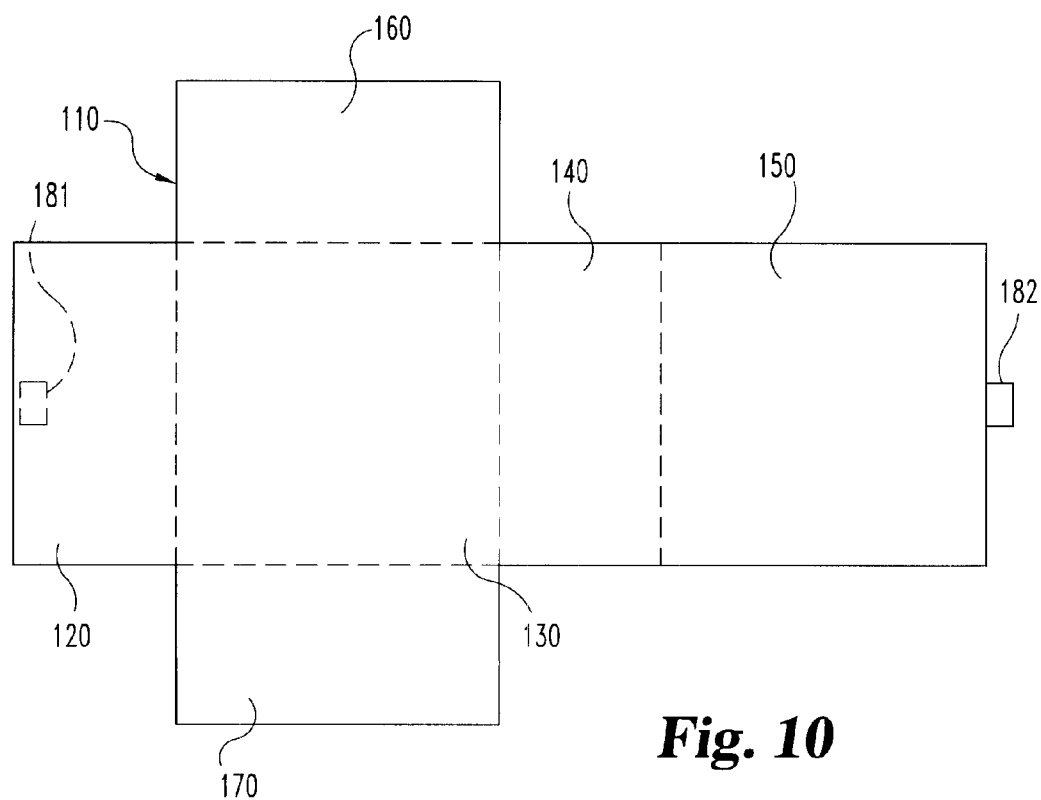
FIG. 10 is a top plan view of a first embodiment of a container in accordance with another aspect of the invention.

A preferred container 110, as depicted in FIG. 10, has six panels 120, 130, 140, 150, 160, 170 that are configured to be folded into a box-like form, and that may be unfolded such that the panels are substantially coplanar (as shown). The panels are preferably connected together by a flexible hinge arrangement as depicted in coplanar relation in FIG. 10, wherein four panels 120, 130, 140, 150 are serially aligned, and wherein two panels 160, 170 are attached to panel 130 such that panels 160, 170 may be rotated to a position perpendicular to panel 130 to form opposite ends of the container. In this way, container 110 can be opened so as to expose its interior surfaces, or closed so as to present its exterior surfaces. Preferably, exterior surfaces are formed out of a tough, scuff-resistant material so that they can survive the usual bumps and abrasions encountered during transport and storage and so they can maintain a presentable appearance.

The container also preferably includes a latch configured to hold the container in the closed position when the kit is not in use. A wide variety of latches that may be used in accordance with the invention are known, an excellent example of which is a simple VELCRO latch. As is well known in the art, a VELCRO latch includes a first half that comprises a plurality of flexible hooks and a second half that includes a plurality of loops. A first half 181 of the latch is affixed to one panel, and a second half 182 is attached to another panel or to a flap affixed to the other panel, whereby, when the container is folded into a closed position, the two halves 181, 182 may be pressed together to releasably hold the container in the closed position. Of course, one or more of the panels may also be configured to engage one or more other panels when in the closed position, to increase the structural integrity of the container when in the closed position. A variety of such configurations are well known in the art, and include, for example, slots and tabs that may be engaged when the container is closed.

Figure 12:
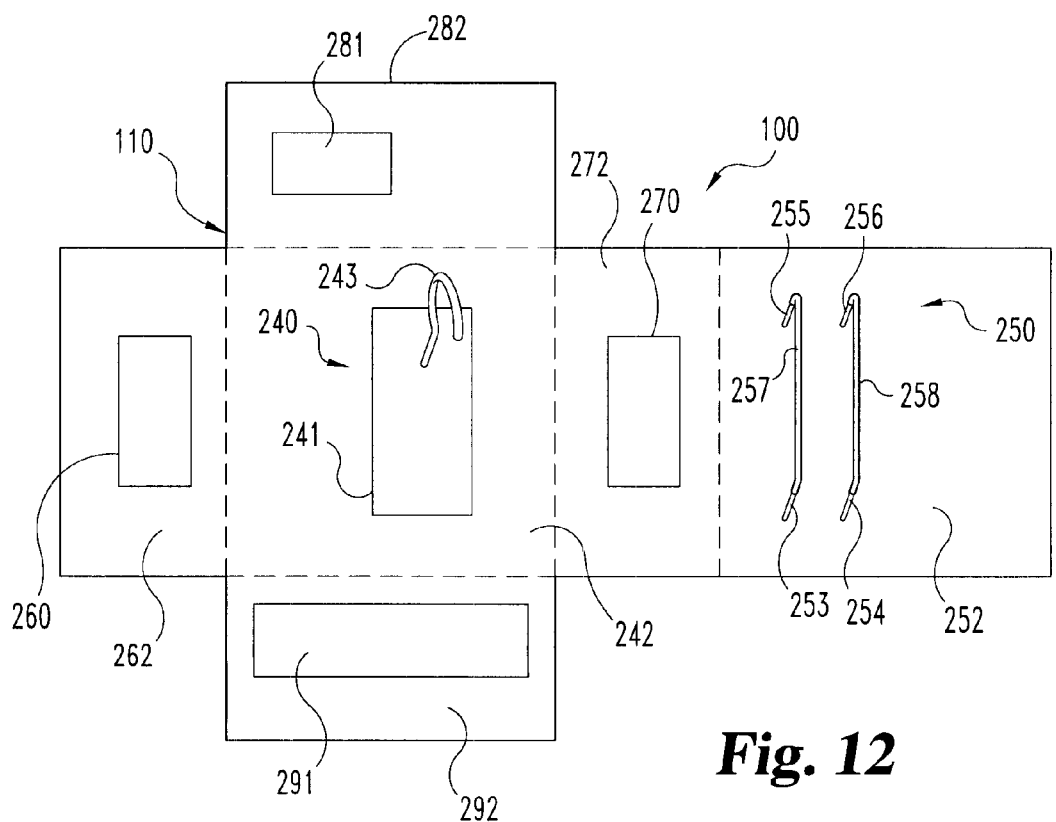
FIG. 12 is a top plan view of an embodiment of a surgical skill practice kit in accordance with the invention.
Figure 12A:
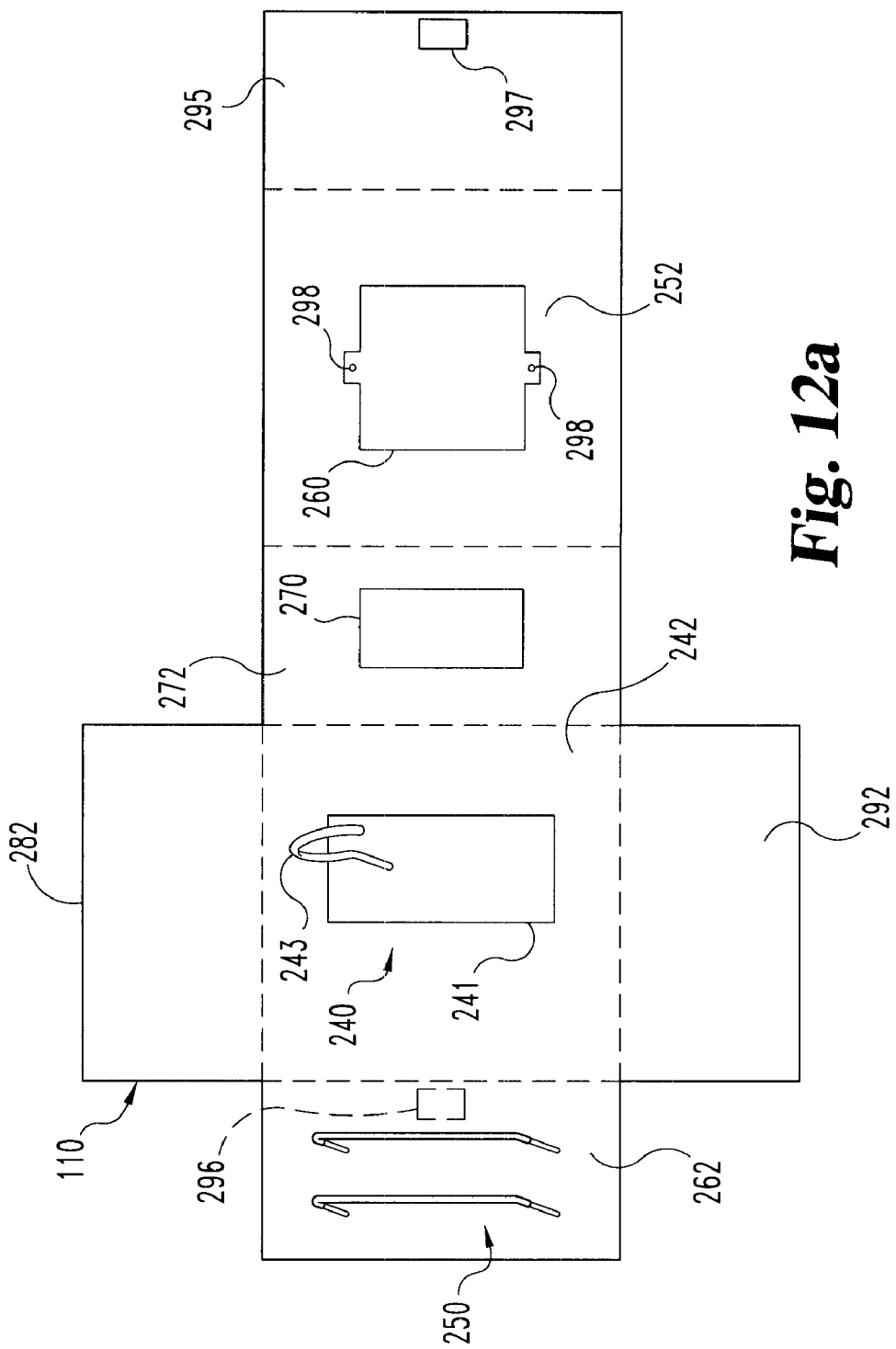
FIG. 12a is a top plan view of a second embodiment of a surgical skill practice kit in accordance with the invention.

In another example, depicted in FIG. 12a, the container includes an additional panel 295 that folds over and overlaps panel 262 when the container is in the closed position, and panels 295 and 262 have latch halves 296, 297 attached thereto in appropriate positions, such as the positions shown in FIG. 12a, such that the halves 296, 297 mate together when the container is closed. The latch may comprise, for example, a snap, a hook and loop fastener or a plurality of straps. It is preferred that the container be configured such that, when in the closed position, the shape of the container resembles a book, and the container may therefore advantageously be stored, for example, by a student, by placing the kit on a bookshelf.

The panels are preferably formed from substantially rigid but lightweight plastic materials. In a particularly preferred embodiment, the panels comprise a corrugated plastic, but the panels may comprise alternate materials, such as, for example, cardboard, wood or metal. The kit is preferably small enough to be conveniently transported, yet large enough to simulate various aspects of surgery as explained in greater detail below. For example, the container, when in its closed position, is preferably from about 6 inches to about 24 inches in length, from about 4 inches to about 12 inches in width, and preferably has a height of from about 2 inches to about 6 inches. More preferably, the container is from about 7 inches to about 10 inches in length, from about 4 inches to about 6 inches in width, and has a height of from about 2 inches to about 4 inches, thereby being readily portable. A student is therefore enabled, for example, to use the kit both at a learning institution and at his or her residence.

Figure 11:
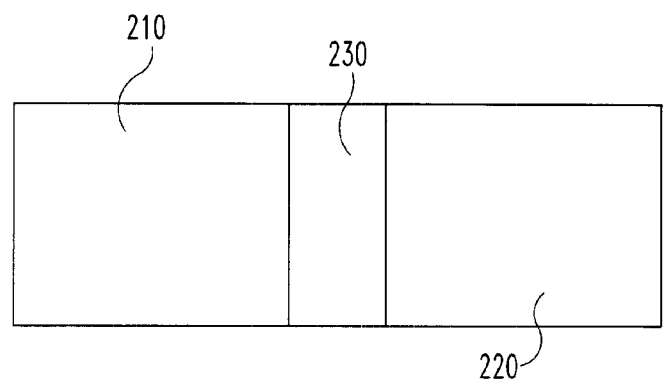
FIG. 11 is a top plan view of a second embodiment of a container in accordance with the invention.

It is of course, understood that the container need not comprise six panels, nor be completely enclosed. For example, the container may include three panels as depicted in FIG. 11 such that two primary panels 210, 220 are hinged on opposite, substantially parallel sides of a secondary panel 230. Thereby, when the container is folded, the primary panels are positioned in opposed, spaced apart relationship, with a degree of spacing between the primary panels to define a chamber capable of containing the contents of the kit. Where the container includes more than two panels, it is preferred that from about 3 to about 4 of the panels be serially hinged together so that the panels can be positioned in a closed position in which the panels form contiguous sides of the container. When in an open position, the panels may advantageously be serially disposed adjacent to and coplanar with one another.

The container also preferably comprises, affixed to the exterior surface of one or more of the panels, mounting means, such as, for example, suction cups, rubber feet or a high-friction coating which will keep the kit relatively stationary on a planar surface such as a desk or table, thereby permitting the user to realistically employ both hands while practicing a particular surgical technique, while maintaining the kit relatively still. Alternatively, the mounting devices may simply comprise straps of scotch tape or metallic clamps to stabilize the base on the table, bench or the like.

The kit advantageously includes one or more practice objects, such as, for example, a sensitive tying device, a tying-against-tension device, a skin simulator and a blood vessel simulator. FIG. 12 depicts a kit 100 including each of these objects; however, it is understood that the kit may include only one, or any combination of these objects. The device 240 associated with at least one of the panels for practicing suture tying techniques comprises a member 241 movably attached to panel 242, and a hook 243 attached to member 241. Thus, when the container is open, or unfolded, the panel or panels function as a base for the device in the manner described above.

The kit 100 may also include a device 250 for practicing the tying of sutures against tension. This device 250 is also preferably mounted on a panel, such as, for example, panel 252 in FIG. 12, of the container 110 such that, when the container is opened and flattened for use, the device 250 is exposed and positioned for the user to practicing this aspect of tying. The tying-against-tension device preferably comprises four retaining structures 253, 254, 255, 256, such as, for example, posts, hooks or the jaws of clamps, rigidly affixed to panel 252 and two elongate elastic members 257, 258, such as, for example sections of rubber tubing, stretched between and affixed to the structures in a spaced apart relationship. In certain embodiments, the stretched rubber tubing of device 250 may be positioned substantially parallel to one another, and in other embodiments the may be positioned in a nonparallel manner. The elastic members may be made of a wide variety of suitable flexible, pliant or resilient materials, such as neoprene, rubber, latex, polyurethane or the like. A satisfactory size may be approximately 4 inches in length and about 0.25 inches in diameter, but can be of a wide variety of alternative dimensions desired. It is preferred that the elastic members 257, 258 be spaced apart in at least one location a distance of from about 1 centimeter to about 10 centimeters, more preferably from about 1 centimeter to about 5 centimeters.

The elastic members 257, 258 are preferably stretched between the retaining structures 253, 254, 255, 256 such that, when the elastic members are pulled toward one another, i.e., in a direction substantially perpendicular to their longitudinal axes, some level of tension is exerted in the opposite direction, i.e., back toward their original positions. Thus, a user can practice the technique of tying a suture against steady tension by looping a filament around both elastic members 257, 258 and tying a tension knot around both elastic members while the members are held together or relatively near one another by the filament. It is preferred that the retaining structures be configured such that the elastic members may be adjustable between the retaining structures such that the tension can be adjusted in accordance with the particular tissue being simulated. In an embodiment wherein the elastic members are not parallel, various positions may be selected for practice in which different amounts of tension are required to pull the elastic members together. It is readily understood that, as the distance between the stretched rubber tubing increases, the tension that must be overcome to pull the tubing together and tie a surgical knot also increases.

Figure 13:
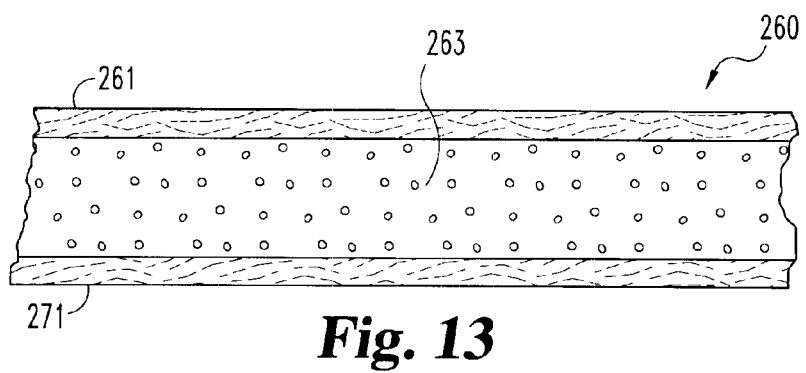
FIG. 13 is a cross sectional view of an embodiment of a skin simulator in accordance with the invention.

The kit 100 may also include a skin simulator 260. The term "skin simulator" is used herein to refer to a composite material that simulates the skin and tissue adjacent thereto on a patient. The skin simulator 260, depicted in FIG. 13, preferably comprises two outer layers 261, 271 separated by an intermediate layer 263 to mimic the subcutaneous tissue. The outer layers 261, 271 may comprise, for example, animal leather, such as cow hide or deer skin, artificial leather, suede, cloth fabric, plastic (opaque or transparent) or other synthetic material having a similar texture and consistency to resemble the outer layer of skin of a patient. The intermediate layer 263 may comprise, for example, a padding made of a spongy or foamy material, such as a high density foam, a wide variety of which are known and readily available commercially. The intermediate layer 263 acts to simulate the subcutaneous fat, muscle tissue and other subcutaneous tissue. It is preferred that the skin simulator 260 be from about 1 centimeter to about 10 centimeters thick.

The skin simulator 260 may be used by a medical student or practitioner to practice making incisions through at least the top layer 261 simulating the outer skin of a patient and the intermediate layer which simulates additional layers of tissue, and to practice abdominal wall closure. In this respect, the bottom layer 271 may preferably be made by using a tougher material or a double layer of a selected material to simulate the fascia of the abdomen. The skin simulator also enables a user to practice suturing of skin, adjacent tissue and fascia.

Figure 14:
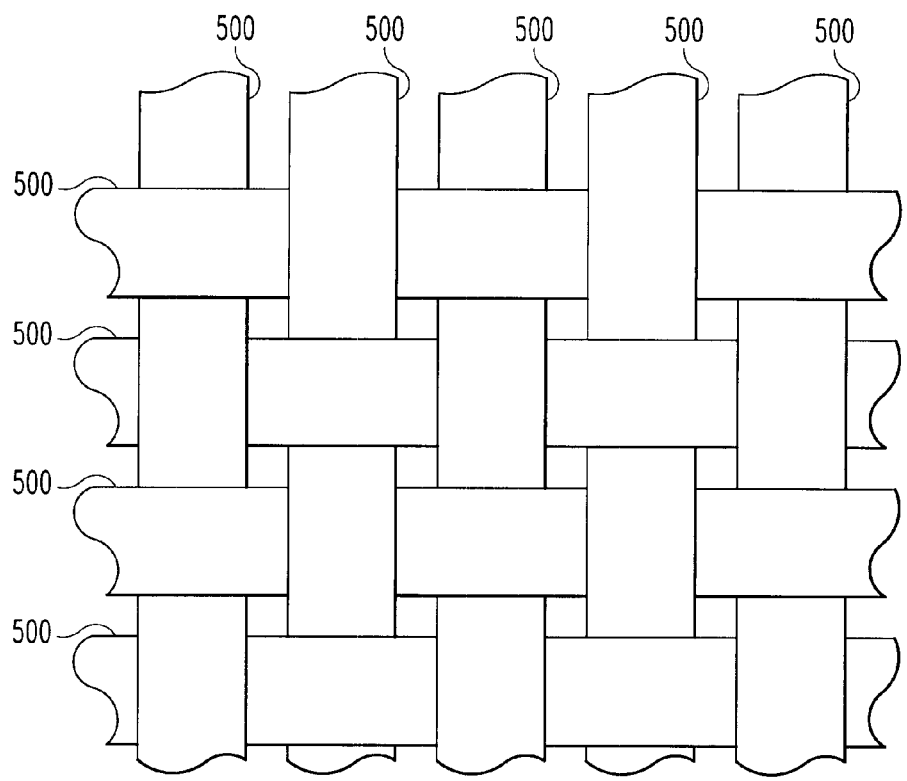
FIG. 14 is a cross sectional view of a second embodiment of a skin simulator including therein a blood vessel simulator in accordance with the invention.

The kit 100 may also include a blood vessel simulator 270. The blood vessel simulator 270 in one aspect of the invention preferably comprises a section of a sheath of woven threads, cloth and/or tissue that can be used to learn and practice clamping, dividing and suturing, over-sewing, repairing or reconnecting blood vessels. A representative example of such a simulator is depicted in FIG. 14, in which reference numeral 500 represents individual interlacing strands, such as rolled or folded fabric in a woven cloth. In an alternative type of blood vessel simulator, larger blood vessels are simulated. In this type, the blood vessel simulator may preferably be tubular in cross-section and may be formed from a material such as polytetrafluoroethylene or other material that simulates synthetic vascular tissue. Another material that may be used is a plastic tube such as those available commercially that are marketed as covers for electric wires and the like. The blood vessel simulator 270 may be used to practice repeatedly cutting, suturing and anastomosing the simulated blood vessels, i.e., end-to-end anastomosing, end-to-side anastomosing and side-to-side anastomosing.

Figure 15:
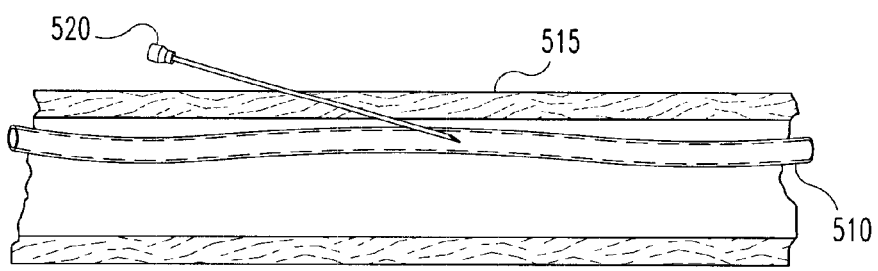
FIG. 15 depicts an embodiment of a blood vessel simulator in accordance with the invention.

In another embodiment of the invention, the kit may include a single simulator that simulates the skin, subcutaneous tissue and blood vessels. For example, the intermediate layer 263 of skin simulator 260 may be made to also include tubes or cords for the simulation of blood vessels under the skin. In this regard, a representative example is depicted in FIG. 15, in which tube 510 is positioned to simulate a blood vessel beneath a skin simulating layer 515, which may alternatively be transparent or opaque. A user may employ this device, for example, to practice inserting an intravenous catheter 520 into a blood vessel percutaneously, either by puncturing the skin simulating layer 515 or by a surgical cut down on the blood vessel simulator, for example. In an embodiment in which layer 515 is transparent, the user is able to visually monitor the progress of the procedure.

It is understood that the skin simulator 260 and the blood vessel simulator 270 may be removably retained in the container. This may be achieved by removably attaching each simulator 260, 270 to the interior of a panel, such as panels 262 and 272, respectively in FIG. 12. An alternative arrangement of practice objects is depicted in FIG. 12a. It is, of course, understood that the practice objects may be arranged in a wide variety of ways, depending upon the size and shape of the panels and the configuration of the container. It is not intended that the invention be limited to the specific arrangements shown. In an embodiment where the container is substantially closed on all sides, the simulators may simply be placed in the container for removal and use when the container is opened.

Alternatively, one or more of the simulators 260, 270 may be permanently attached to panels 262, 272 in a wide variety of ways, such as, for example, by pasting, gluing or sewing; however, affixing the simulators in this manner is not preferred because permanently affixed simulators cannot be readily replaced when they have become worn or otherwise used up. In an embodiment wherein the simulators 260, 270 are removably attached to panels 262, 272 for ease of use and replacement, attachment may be accomplished using a wide variety of techniques known in the art, such as, for example, by using VELCRO, snaps or the like. In one preferred embodiment, one or more panels may have cork board or the like attached thereto so that the simulator or simulators may be stabilized to the panel or panels using thumb tacks or the like that penetrate a portion of the simulator and anchor the same into the cork board. An example of such an arrangement is provided in FIG. 12a, in which skin simulator 260 is affixed to panel 252 by thumb tacks, represented by reference numerals 298 and 299.

In another preferred embodiment, where the simulators are removably attached using VELCRO, one half of each mateable pair of VELCRO fastening strips may be adhered directly to the interior of one or more panels of the container, while the other half may be secured to the simulators. It is, of course, preferred that the mateable half secured to the simulator cover only a minor portion of the simulator so that a maximum amount of the same is available for its intended use.

Alternatively, simulators may be attached to one end of a tether, such as a string or other filament, which is attached at its other end to a panel of the container. In this embodiment, the simulator may be moved about and used, but is less likely to be lost due to the tether.

The kit 100 may also advantageously be configured to carry various surgical instruments and supplies, such as, for example, needle holders, forceps, scissors, needles, threads, sutures and/or other filaments, that may be used in practicing the surgical techniques. Thus, referring to FIG. 12, a kit may also include a tool-carrying surface or device 281, and/or a supply-carrying surface or device 291, such as, for example, on one or both of panels 282, 292. A variety of configurations known in the art may be utilized to hold tools and supplies, and examples of the same are provided in U.S. Pat. No. 5,310,348 to Miller, which patent, along with all other references cited herein, is hereby incorporated by reference herein in its entirety. As additional or alternative practice objects, the kit may include objects that simulate small and large bowels and the stomach.

In view of the above, it is seen that the present invention provides a number of excellent devices, methods and kits that may be used for purposes of training or practicing a variety of surgical techniques. While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method for practicing suture tying techniques, comprising:

providing a practice device comprising a base; a movable elongate member at rest upon said base, the member having a first end and a second end, wherein said member is in contact with said base and pivotally attached to said base at said first end; a first hook attached to said member at a first location between said first end and said second end; and a second hook attached to said member at a second location between said first end and said second end, such that exertion of an actual force in excess of a threshold force upon the first hook or second hook causes at least a portion of said member to move away from said base;

forming a knot that engages the hook; and determining whether at least a portion of said member moves away from said base, thereby indicating that the actual force exceeds the threshold force.

2. The method in accordance with claim 1, wherein the member is pivotally attached to the base by a hinge.

3. The method in accordance with claim 1, wherein the first hook, the second hook or both is slidably attached to the member, and positionable at variable locations from a first position adjacent the first end to a second position adjacent the second end.

4. The method in accordance with claim 1, further comprising:

removing the knot from the hook; and repeating said forming to practice knot tying.

5. The method in accordance with claim 1, wherein the device further comprises a signaling mechanism that actuates an indicator when at least a portion of the member moves away from the base; and wherein said determining comprises monitoring the indicator.

6. The method in accordance with claim 5, wherein the signaling mechanism comprises an electrical circuit including an indicator that is activated when at least a portion of the member moves away from the base.

7. The method in accordance with claim 6, wherein the indicator is selected from the group consisting of a light source and a sound source.

8. The method in accordance with claim 1, wherein the device further comprises a third hook attached to the member at a third location between the first end and the second end.

9. The method in accordance with claim 8, wherein the device further comprises a fourth hook attached to the member at a fourth location between the first end and the second end.

10. A device for practicing suture tying techniques, comprising:

a base;

an elongate member at rest upon said base, said member having a first end and a second end, wherein said elongate member is in contact with said base, and wherein said elongate member is pivotally attached to said base at the first end;

a first hook attached to said elongate member at a first location between the first end and the second end; and a second hook attached to said member at a second location between the first end and the second end;

wherein said member is operable to move from a first position to a second position relative to said base in response to exertion of a predetermined force on said hook by tying a knot thereto, said member being operable to be reconfigured in said first position.

11. The device in accordance with claim 10, wherein said elongate member is pivotally attached to the base by a hinge.

12. The device in accordance with claim 11, further comprising a knot tied to said hook.

13. The device in accordance with claim 10, wherein the first hook, the second hook or both is slidably attached to the member, and wherein the first hook may be positioned at variable locations from a first position adjacent the first end to a second position adjacent the second end.

14. The device in accordance with claim 10, wherein said member is engaged to the base by a member selected from the group consisting of a hook and loop fastener, a releasable reusable adhesive material, a magnetic force and the force of gravity.

15. The device in accordance with claim 10, wherein the device further comprises a signaling mechanism that emits a signal when at least a portion of said member moves away from said base.

16. The device in accordance with claim 15, wherein said signaling mechanism comprises an electrical circuit including an indicator that is actuated when at least a portion of said member moves away from said base.

17. The device in accordance with claim 16, wherein the indicator is selected from the group consisting of a light source and a sound source.

18. The device in accordance with claim 10, wherein movement from the first position to the second position causes at least a portion of said member to move away from said base.

19. The device in accordance with claim 10, wherein the device further comprises a third hook attached to the member at a third location between the first end and the second end.

20. The device in accordance with claim 19, wherein the device further comprises a fourth hook attached to the member at a fourth location between the first end and the second end.

21. The device in accordance with claim 10, wherein the member weighs from 25 grams to 200 grams.

22. A kit for practicing techniques common to a variety of surgical procedures, comprising:
   a container comprising a plurality of substantially planar panels, the panels being serially hinged together such that the panels can be positioned in a closed position in which the panels form a container, and an open position in which the panels are disposed adjacent to and coplanar with one another; and
   a first device associated with a first panel for practicing suture tying techniques, the device comprising an elongate member having a first end and a second end, wherein the first end of the member is pivotally attached to the first panel;
   wherein the member has attached thereto a component selected from the group consisting of:
      a first hook slidably attached to the member whereby the first hook may be positioned at variable locations from the first end to the second end; and
      a plurality of hooks attached to said member at different positions between the first end and second end.

23. The kit in accordance with claim 22, further comprising a second device associated with a second panel for practicing suture-tying techniques against tension.

24. The kit in accordance with claim 23, wherein said second device comprises first, second, third and fourth retaining structures, a first elastic member spanning the first and second retaining structures, and a second elastic member spanning the third and fourth retaining structures.

25. The kit in accordance with claim 24, wherein the first elastic member is substantially parallel to the second elastic member.

26. The kit in accordance with claim 24, wherein said first, second, third and fourth retaining structures each comprise a member selected from the group consisting of a post, a hook and a clamp.

27. The kit in accordance with claim 24, wherein said first and second elastic members are held by said retaining structures in a stretched arrangement.

28. The kit in accordance with claim 22, further comprising a skin simulator.

29. The kit in accordance with claim 28, wherein said skin simulator comprises first and second outer layers and an intermediate layer, wherein the intermediate layer comprises a member selected from the group consisting of a padding, a spongy material and a foam material.

30. The kit in accordance with claim 28, wherein said first and second outer layers comprise a member selected from the group consisting of animal leather, cow hide, deer skin, artificial leather, suede, fabric, plastic and other synthetic material having a similar texture and consistency to resemble the outer layer of skin of a patient.

31. The kit in accordance with claim 22, further comprising a blood vessel simulator.

32. A device for practicing suture tying techniques, comprising:
   a base;
   an elongate member at rest upon said base, said member having a first end and a second end, wherein said elongate member is in contact with said base, and wherein said elongate member is pivotally attached to said base at the first end; and
   a first hook slidably attached to said elongate member;
   wherein said member is operable to move from a first position to a second position relative to said base in response to exertion of a predetermined force on said hook by tying a knot thereto, said member being operable to be reconfigured in said first position; and
   wherein said first hook may be positioned at variable locations from the first end to the second end.

33. The device in accordance with claim 32, wherein said elongate member is pivotally attached to the base by a hinge.

34. The device in accordance with claim 32, wherein the device further comprises a second hook attached to the member at a second location between the first end and the second end.

35. The device in accordance with claim 32, wherein said member is engaged to the base by a member selected from the group consisting of a hook and loop fastener, a releasable reusable adhesive material, a magnetic force and the force of gravity.

36. The device in accordance with claim 32, wherein the device further comprises a signaling mechanism that emits a signal when at least a portion of said member moves away from said base.

37. The device in accordance with claim 36, wherein said signaling mechanism comprises an electrical circuit including an indicator that is actuated when at least a portion of said member moves away from said base.

38. The device in accordance with claim 37, wherein the indicator is selected from the group consisting of a light source and a sound source.

39. The device in accordance with claim 32, wherein the member weighs from 25 grams to 200 grams.

40. The device in accordance with claim 32, wherein movement from the first position to the second position causes at least a portion of said member to move away from said base.

41. A method for practicing suture tying techniques, comprising:
   providing a practice device comprising a base; a movable elongate member at rest upon said base, the member having a first end and a second end, wherein the member is in contact with the base and pivotally attached to the base at the first end; and a first hook slidably attached to said member such that exertion of an actual force in excess of a threshold force upon the first hook causes at least a portion of the member to move away from the base, wherein the first hook may be positioned at variable locations from the first end to the second end;
   forming a knot that engages the hook; and
   determining whether at least a portion of said member moves away from said base, thereby indicating that the actual force exceeds the threshold force.

42. The method in accordance with claim 41, wherein the member is pivotally attached to the base by a hinge.

43. The method in accordance with claim 41, wherein the device further comprises a second hook attached to the member at a second location between the first end and the second end.

44. The method in accordance with claim 41, further comprising:
   removing the knot from the hook; and
   repeating said forming to practice knot tying.

45. The method in accordance with claim 41, wherein the device further comprises a signaling mechanism that actuates an indicator when at least a portion of the member moves away from the base; and wherein said monitoring comprises monitoring the indicator.

46. The method in accordance with claim 45, wherein the signaling mechanism comprises an electrical circuit including an indicator that is activated when at least a portion of the member moves away from the base.

47. The method in accordance with claim 46, wherein the indicator is selected from the group consisting of a light source and a sound source.

48. A device for practicing suture tying, comprising:

a base;

an elongate member at rest upon said base, said member having a first end and a second end, wherein said member is in contact with said base, and wherein the first end of said member is pivotally attached to said base;

means for signaling when at least a portion of said member moves away from said base; and a component attached to said member, the component selected from the group consisting of:
 a first hook slidably attached to the member whereby the first hook may be positioned at variable locations from the first end to the second end; and
 a plurality of hooks attached to said member at different positions between the first end and second end;

wherein exertion of a threshold force upon said component causes said member to move such that at least a portion of said member moves away from said base.

* * * * *